UNITED STATES PATENT OFFICE.

CLINTON EMERSON DOLBEAR, OF BERKELEY, CALIFORNIA, ASSIGNOR TO FRANK H. HITCHCOCK, OF WASHINGTON, DISTRICT OF COLUMBIA.

PROCESS OF REFINING POTASH-BEARING BRINES.

1,058,684. Specification of Letters Patent. Patented Apr. 8, 1913.

No Drawing. Application filed January 22, 1913. Serial No. 743,687.

*To all whom it may concern:*

Be it known that I, CLINTON EMERSON DOLBEAR, a citizen of the United States, residing at Berkeley, in the county of Alameda and State of California, have invented certain new and useful Improvements in Processes of Refining Potash-Bearing Brines, of which the following is a specification.

My invention relates to methods of separating the more valuable ingredients of potassium-bearing brines from the less valuable ingredients thereof.

The invention, in its broadest aspect, resides in a novel procedure contemplating the separation of the more valuable ingredients of potassium-bearing brine from the less valuable ingredients thereof and in turn separating the separated more valuable salts from each other.

The invention, in another aspect, resides in effecting such separation, separating the precipitate from the mother brine, and separating the precipitated salts from each other.

My invention is based on the discovery that if a potassium-bearing brine is treated with carbon dioxid and with a substance capable of forming an insoluble double salt with potassium and also an insoluble borate, sodium bicarbonate, and insoluble borate and an insoluble double potassium salt are formed and being insoluble in the solution, precipitate therefrom.

My invention, therefore, contemplates a treatment of potassium-bearing brines with the substances stated and, in certain aspects, further resides in separating the precipitate from the mother liquor and by treating the same with water at a suitable temperature the sodium bicarbonate is alone dissolved and can thus be separated from the remaining precipitate and that if this still remaining precipitate be heated at a sufficiently high temperature to decompose the double potassium salt the contained potassium salt is alone soluble and can be separated from the precipitate and borax or boric acid can be recovered from the precipitate.

My process is peculiarly adapted for the treatment of the Searles Borax Lake brine in San Bernardino county, California. It is likewise applicable to brines found elsewhere.

In describing how this invention is to be carried into effect, I will take as an example the refining of brine from Searles Borax Lake. In practice with such a brine, I prefer to use magnesium carbonate as the substance capable of forming an insoluble double salt with potassium and also an insoluble borate. This brine is composed of an aqueous solution of sodium chlorid 16.77 per cent., sodium sulfate 5.46 per cent., sodium carbonate 4.61 per cent., potassium chlorid 4.49 per cent. and sodium tetraborate 1.32 per cent., all of these substances being calculated as anhydrous salts. In a suitable vessel a given quantity of this brine is treated with an excess of 8.5 per cent. of its weight of magnesium carbonate in finely divided condition and subjected to the action of carbon dioxid either at or above atmospheric pressure.

The carbon dioxid combines with the sodium carbonate and a portion of water and forms sodium bicarbonate which is only slightly soluble in the solution and is mostly precipitated therefrom. The carbon dioxid also combines with the magnesium carbonate and a portion of water and forms magnesium bicarbonate which is to considerable extent soluble in the solution and therefore dissolves therein. This dissolved magnesium bicarbonate immediately reacts with the sodium tetra borate forming the insoluble magnesium tetra borate and sodium bicarbonate as illustrated by the symbolic equation

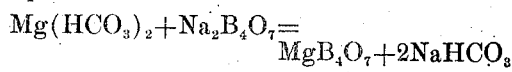
$$Mg(HCO_3)_2 + Na_2B_4O_7 = MgB_4O_7 + 2NaHCO_3$$

The magnesium borate is quite insoluble in the solution and almost completely precipitates therefrom as does the sodium bicarbonate thus formed. A further portion of the magnesium bicarbonate together perhaps with some normal magnesium carbonate reacts with the potassium chlorid forming a potassium magnesium carbonate according to the following symbolic illustrations:

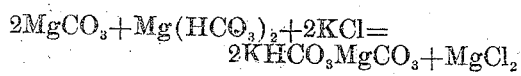

or

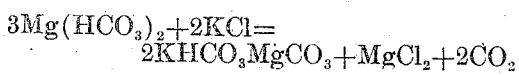

or

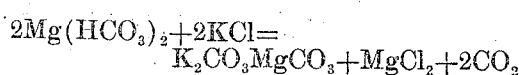

Just the exact nature of the reaction is impossible to state but the result is the formation of either the double salt normal potassium magnesium carbonate ($K_2CO_3MgCO_3$) or the double salt potassium bicarbonate magnesium carbonate ($KHCO_3MgCO_3$) or a mixture of both according to the conditions of temperature, pressure, etc., under which the reaction takes place. It is immaterial for practical purposes which is formed as both are very little soluble in the brine and are consequently mostly precipitated therefrom. The final result of these reactions is the formation of a precipitate composed of sodium bicarbonate, magnesium tetra borate and potassium magnesium carbonate or bicarbonate. This precipitate is separated by decantation or filtration from the mother brine. Warm water, not sufficiently hot to decompose the double potassium magnesium carbonate is added in sufficient quantity to completely dissolve the contained sodium bicarbonate. This solution is separated from the precipitate by decantation or filtration and the contained carbonate recovered by evaporation or lowering of temperature and crystallization as will be well understood. The remaining precipitate is heated sufficiently high to decompose the double potassium magnesium carbonate contained therein. This can be done either by heating the dry precipitate or by heating in water at about 100 degrees centigrade or higher. If heated dry it is afterward treated with sufficient water to completely dissolve the liberated potassium carbonate or bicarbonate or both. If heated with water sufficient water is used or afterward added to completely dissolve the liberated potassium carbonate or bicarbonate or both. This solution is separated from the remaining precipitate by decantation or filtration and treated by any of the usual methods such as evaporation or crystallization to recover the potassium carbonate therefrom. The remaining precipitate now contains magnesium tetra borate and magnesium carbonate and as the amount of magnesium carbonate present is greater than the magnesium tetra borate it is economically advisable to use the precipitate for the treatment of more of the original brine the presence of magnesium borate being harmless. With an equal amount of brine used in the first operation sufficient magnesium carbonate should be added to this remaining precipitate to replace that which is decomposed in the reactions forming magnesium chlorid and magnesium tetra borate. At the end of each cycle of this process the remaining precipitate is richer in magnesium borate as all of the sodium tetra borate present is converted into sodium bicarbonate and magnesium tetra borate. After repeated use the last remaining precipitate will be rich in magnesium tetra borate and is then treated by the usual methods employed in borax or boric acid manufacture from magnesium borate minerals as will be well understood.

It is to be understood that this invention is not limited to any particular sequence of steps or simultaneous operations or reactions.

Having thus described my invention and a preferred manner of carrying it into practice, what I claim and desire to secure by Letters-Patent is:

1. The process of recovering the more valuable ingredients from a brine bearing potassium and sodium consisting in treating the brine with carbon dioxid and with a substance capable of forming an insoluble double salt with potassium.

2. The process of recovering the more valuable ingredients from a brine bearing potassium and sodium consisting in treating the brine with carbon dioxid and with a substance capable of forming an insoluble double carbonate with potassium.

3. The process of recovering the more valuable ingredients from a brine bearing potassium, sodium and boron consisting in treating the brine with carbon dioxid and with a substance capable of forming an insoluble double salt with potassium and an insoluble borate.

4. The process of recovering the more valuable ingredients from brine bearing chlorids, sulfates, carbonates and borates of sodium and potassium consisting in treating the brine with carbon dioxid and with a substance capable of forming insoluble potassium and boron compounds.

5. The process of recovering the more valuable ingredients of brine carrying potassium, sodium and boron, consisting in treating the brine with magnesium bicarbonate and carbon dioxid whereby any sodium carbonate present is precipitated as sodium bicarbonate, any soluble borate present is decomposed and the boric acid radical thereof is precipitated as a magnesium borate, and the potassium salt present is decomposed, the potassium thereof forming a potassium carbonate and joining with a magnesium carbonate and precipitating as a double potassium magnesium carbonate.

6. The process of recovering the more valuable ingredients of brine bearing potassium, sodium and boron consisting in treating the brine with magnesium carbonate and carbon dioxid in excess of the amount required to convert the magnesium carbonate into magnesium bicarbonate, whereby any sodium carbonate present is precipitated as sodium bicarbonate, any soluble borate present is decomposed and the boric acid radical thereof is precipitated as a magnesium borate, and the potassium salt present is decomposed, the potassium thereof forming a potassium carbonate and joining with a magnesium carbonate and precipitating as a double potassium magnesium carbonate.

7. The process of refining brine carrying potassium and sodium compounds consisting in subjecting the brine to the action of a magnesium carbonate and carbon dioxid.

8. The process of recovering the more valuable ingredients of brine bearing potassium, sodium and boron, consisting in treating the brine with magnesium bicarbonate and carbon dioxid whereby any sodium carbonate present is precipitated as sodium bicarbonate, any soluble borate present is decomposed and the boric acid radical thereof is precipitated as a magnesium borate, and the potassium salt present is decomposed, the potassium thereof forming a potassium carbonate and joining with a magnesium carbonate and precipitating as a double potassium magnesium carbonate separating the precipitated salts from the mother liquor, treating the precipitated salts with water not sufficiently warm to decompose the double potassium magnesium carbonate, whereby the sodium bicarbonate alone is dissolved, separating the dissolved sodium bicarbonate from the remaining precipitate, heating the remaining precipitate sufficiently high to decompose the double potassium magnesium carbonate, dissolving the liberated potassium carbonate in water, separating the dissolved potassium carbonate from the remaining precipitate and treating the remaining precipitate to remove a boron compound therefrom.

9. The process of recovering the more valuable ingredients of potassium-bearing brine, consisting in treating the brine with magnesium bicarbonate and an excess of carbon dioxid whereby any sodium carbonate present is precipitated as sodium bicarbonate, any soluble borate present is decomposed and the boric acid radical thereof is precipitated as a magnesium borate, and the potassium salt present is decomposed, the potassium thereof forming a potassium carbonate and joining with a magnesium carbonate and precipitating as a double potassium magnesium carbonate, separating the precipitated salts from the mother liquor, treating the precipitated salts with water not sufficiently warm to decompose the double potassium magnesium carbonate, whereby the sodium bicarbonate alone is dissolved, separating the dissolved sodium bicarbonate from the remaining precipitate, heating the remaining precipitate sufficiently high to decompose the double potassium magnesium carbonate, dissolving the liberated potassium carbonate in water, separating the dissolved potassium carbonate from the remaining precipitate and treating the remaining precipitate to remove borax therefrom.

10. The process of recovering sodium carbonate, sodium borate and soluble potassium compounds from brines containing them in solution together with sodium chlorid and sodium sulfate, consisting in treating the brine with magnesium bicarbonate and carbon dioxid whereby the sodium carbonate is precipitated as sodium bicarbonate, the borate decomposed and precipitated as magnesium borate and the potassium of the potassium salt is precipitated as a double potassium magnesium carbonate, separating the precipitate from the mother brine and separating the precipitated mixed salts from each other.

11. The method of recovering sodium carbonate, borax and soluble potassium compounds from brine containing them in solution together with sodium chlorid and sodium sulfate, consisting in treating the brine with magnesium bicarbonate and carbon dioxid, separating the precipitate from the remaining brine, treating the precipitate with water to dissolve the sodium bicarbonate, separating the precipitate from the dissolved sodium bicarbonate, heating the precipitate to a temperature sufficiently high to decompose the double magnesium potassium carbonate, dissolving the liberated potassium carbonate in water and lastly recovering the boric acid radical of the magnesium borate.

In testimony whereof I affix my signature in presence of two witnesses.

CLINTON EMERSON DOLBEAR.

Witnesses:
EDMUND H. PARRY,
A. M. PARKINS.